(12) United States Patent
Shimizu et al.

(10) Patent No.: US 12,103,465 B2
(45) Date of Patent: Oct. 1, 2024

(54) MOBILE BODY, INTERACTION PROVIDING SYSTEM, AND INTERACTION PROVIDING METHOD

(71) Applicant: HONDA MOTOR CO., LTD., Tokyo (JP)

(72) Inventors: Katsumi Shimizu, Tokyo (JP); Shinya Yasuhara, Tokyo (JP); Kayoko Fukasawa, Tokyo (JP); Daisuke Ide, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 318 days.

(21) Appl. No.: 17/457,043

(22) Filed: Dec. 1, 2021

(65) Prior Publication Data

US 2022/0185197 A1    Jun. 16, 2022

(30) Foreign Application Priority Data

Dec. 14, 2020 (JP) ................................ 2020-206670

(51) Int. Cl.
| | |
|---|---|
| *B60R 11/02* | (2006.01) |
| *A63F 13/211* | (2014.01) |
| *A63F 13/24* | (2014.01) |
| *A63F 13/803* | (2014.01) |
| *B60R 11/00* | (2006.01) |

(52) U.S. Cl.
CPC ............ *B60R 11/02* (2013.01); *A63F 13/211* (2014.09); *A63F 13/24* (2014.09); *A63F 13/803* (2014.09); *B60R 2011/001* (2013.01)

(58) Field of Classification Search
CPC .... A63F 13/211; A63F 13/245; A63F 13/428; A63F 13/803; A63F 13/98; B60R 11/02
See application file for complete search history.

(56) References Cited

U.S. PATENT DOCUMENTS

| | | | |
|---|---|---|---|
| 10,391,406 B2* | 8/2019 | Kim ...................... | A63F 13/803 |
| 11,185,767 B2* | 11/2021 | Ho ........................ | A63F 13/245 |
| 2007/0149284 A1* | 6/2007 | Plavetich .............. | A63F 13/803 |
| | | | 463/37 |
| 2007/0268146 A1 | 11/2007 | Itou | |
| 2012/0270663 A1* | 10/2012 | Markowitz .......... | A47C 15/004 |
| | | | 463/47 |

(Continued)

FOREIGN PATENT DOCUMENTS

| | | |
|---|---|---|
| CN | 101074020 A | 11/2007 |
| CN | 205524018 U | 8/2016 |

(Continued)

OTHER PUBLICATIONS

Japanese Office Action corresponding to JP Application No. 2020206670 A, with English translation, dated Aug. 22, 2023, 7 pages.

(Continued)

*Primary Examiner* — David L Lewis
*Assistant Examiner* — Robert E Mosser
(74) *Attorney, Agent, or Firm* — Rankin, Hill & Clark LLP

(57) ABSTRACT

A mobile body includes a steering unit that is displaced according to an operation by a driver, and an operation terminal holding unit that detachably holds, in the steering unit, an operation terminal including an attitude change detection unit that detects an attitude change.

10 Claims, 7 Drawing Sheets

(56) References Cited

U.S. PATENT DOCUMENTS

2018/0193732 A1* 7/2018 Kamata ................. A63F 13/428
2019/0374852 A1* 12/2019 Sakaguchi ............. A63F 13/23

FOREIGN PATENT DOCUMENTS

| | | |
|---|---|---|
| CN | 211478613 U | 9/2020 |
| DE | 103 08 897 A1 | 10/2004 |
| JP | S61-082540 A | 4/1986 |
| JP | H11-275181 A | 10/1999 |
| JP | 2001-038052 A | 2/2001 |
| JP | 2006-203737 A | 8/2006 |
| JP | 2008-230429 A | 10/2008 |
| JP | 2014-119279 A | 6/2014 |
| JP | 2017-167091 A | 9/2017 |
| JP | 2020-075720 | 5/2020 |
| KR | 10-2012-0082752 A | 7/2012 |

OTHER PUBLICATIONS

Japanese Office Action dated Jan. 9, 2024, Japanese Application No. 2020-206670.A, English translation included, 7 pages.
Chinese Office Action dated Dec. 13, 2023, Chinese Application No. 202111419705.A, English translation included, 12 pages.
Japanese Office Action dated Jun. 25, 2024 issued in corresponding Japanese application No. 2020-206670; English translation included (9 pages).

* cited by examiner

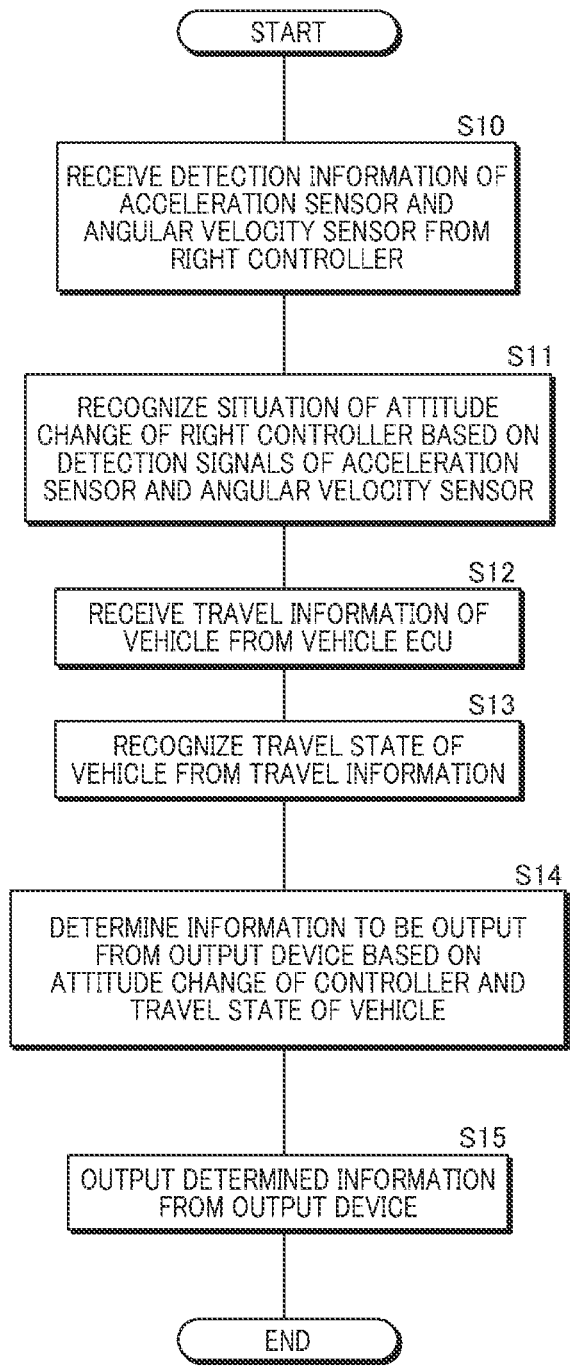

MOBILE BODY, INTERACTION PROVIDING SYSTEM, AND INTERACTION PROVIDING METHOD

INCORPORATION BY REFERENCE

The present application claims priority under 35 U.S.C. § 119 to Japanese Patent Application No. 2020-206670 filed on Dec. 14, 2020. The content of the application is incorporated herein by reference in its entirety.

BACKGROUND

Technical Field

The present invention relates to a mobile body, an interaction providing system, and an interaction providing method.

Related Art

Conventionally, there has been proposed a system that detects information regarding an occupant of a vehicle and information outside the vehicle and outputs a voice and a virtual image in synchronization with each other based on the information, thereby providing interaction for entertaining the occupant (see, for example, JP 2020-75720 A).

The above-described system acquires information regarding the occupant by an in-vehicle camera, an in-vehicle microphone, a seating sensor, and the like and acquires information outside the vehicle by a vehicle exterior camera, a navigation device, and the like. Then, the system provides the occupant with interaction in which the virtual image and the voice are output in synchronization with each other according to the situation of the occupant.

SUMMARY

As in the above-described conventional system, in a mobile body such as a vehicle or the like, in order to provide interaction according to the situation of the passenger, it is desirable to recognize the situation of the passenger in the mobile body with a simple configuration.

The present invention has been made in view of such a background, and an object thereof is to provide a mobile body, an interaction providing system, and an interaction providing method capable of recognizing a situation of a passenger of the mobile body with a simple configuration.

A first aspect for achieving the above-described object is a mobile body including a steering unit that is displaced according to an operation by a driver, and an operation terminal holding unit that detachably holds, in the steering unit, an operation terminal including an attitude change detection unit that detects an attitude change.

In the above described mobile body, it may be configured to include a terminal device holding unit that detachably holds, at a predetermined position of the mobile body, a terminal device that has a display and to which the operation terminal is detachably attached as a controller.

In the above-described mobile body, the operation terminal holding unit may be configured to detachably hold, in the steering unit, one or a plurality of the operation terminals detachably attached to the terminal device as a controller.

A second aspect for achieving the above-described object is an interaction providing system for providing interaction in a mobile body including a steering unit that is displaced according to an operation by a driver, and an operation terminal holding unit that detachably holds, in the steering unit, an operation terminal including an attitude change detection unit that detects an attitude change, the interaction providing system includes an operation terminal holding recognition unit that recognizes that the operation terminal is held in the operation terminal holding unit, and an interaction control unit that executes interaction control to determine information to be output from an output device used in the mobile body based on a situation of detecting the attitude change of the operation terminal by the attitude change detection unit when the operation terminal holding recognition unit recognizes that the operation terminal is held in the operation terminal holding unit.

In the above-described interaction providing system, it may be configured that the operation terminal is a controller detachably attached to a terminal device including a display and a speaker, the mobile body includes a terminal device holding unit that detachably holds the terminal device at a predetermined position of the mobile body, and a terminal device holding recognition unit that recognizes that the terminal device is held in the terminal device holding unit, and the interaction control unit executes the interaction control using at least one of the display and the speaker as the output device in a case where the operation terminal holding recognition unit recognizes that the operation terminal is held in the operation terminal holding unit and the terminal device holding recognition unit recognizes that the terminal device is held in the terminal device holding unit.

In the above-described interaction providing system, it may be configured that the operation terminal holding recognition unit, the terminal device holding recognition unit, and the interaction control unit are included in the terminal device.

In the above-described interaction providing system, the operation terminal may be a controller of a terminal device, and the interaction providing system may include a content information output unit that outputs, from the output device, information on content that can be used by installing a predetermined application in the terminal device when the operation terminal holding recognition unit recognizes that the operation terminal is held in the operation terminal holding unit.

In the above-described interaction providing system, it may be configured that the operation terminal holding unit detachably holds one or a plurality of the operation terminals, the operation terminal holding recognition unit recognizes the number of the operation terminals held in the operation terminal holding unit, and the interaction control unit changes content of processing by the interaction control according to the number of the operation terminals recognized by the operation terminal holding recognition unit.

In the above-described interaction providing system, it may be configured that a movement state recognition unit that recognizes a movement state of the mobile body is included, and the interaction control unit may determine, in the interaction control, the information to be output from the output device based on the attitude change of the operation terminal detected by the attitude change detection unit and the movement state of the mobile body recognized by the movement state recognition unit.

A third aspect for achieving the above-described object is an interaction providing method executed by a computer to provide interaction in a mobile body including a steering unit that is displaced according to an operation by a driver, and an operation terminal holding unit that detachably holds, in the steering unit, an operation terminal including an attitude change detection unit that detects an attitude change, the interaction providing method includes steps of recognizing that the operation terminal is held in the operation terminal holding unit, and executing interaction control to determine information to be output from an output device used in the mobile body based on a situation of detecting the attitude change of the operation terminal by the attitude change detection unit when it is recognized that the operation terminal is held in the operation terminal holding unit.

According to the above-described mobile body, the operation terminal holding unit is provided in the steering unit of the mobile body, and the attitude change detection unit of the operation terminal held by the operation terminal holding unit enables the operation situation of the steering unit by the driver of the mobile body to be recognized. With this simple configuration, it is possible to recognize the situation of the driver of the mobile body and provide the interaction.

BRIEF DESCRIPTION OF DRAWINGS

FIG. 7 is a flowchart of interaction control processing.

DETAILED DESCRIPTION

1. Mode of Detachably Attaching Game Machine to Vehicle

Figure 1:
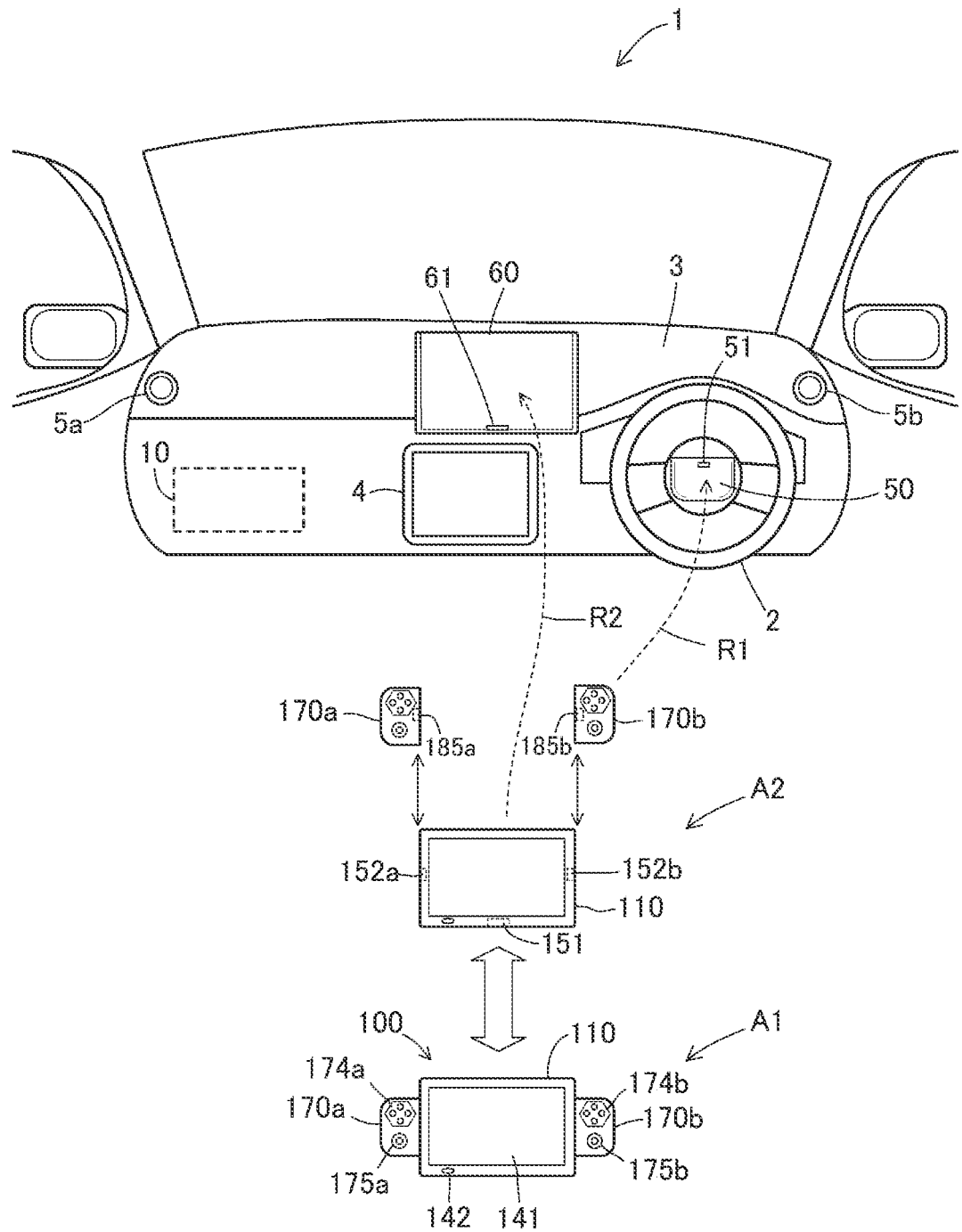
FIG. 1 is an explanatory diagram of a configuration for detachably attaching a game machine to a vehicle.

A mode in which a game machine 100 is detachably attached to a vehicle 1 will be described with reference to FIGS. 1 to 3. The vehicle 1 corresponds to a mobile body of the present disclosure, and the game machine 100 corresponds to a terminal device of the present disclosure. Referring to FIG. 1, the game machine 100 includes a game machine body 110, and a left controller 170a and a right controller 170b for operating the game machine body 110. The left controller 170a and the right controller 170b correspond to an operation terminal of the present disclosure. The game machine body 110 includes a display 141 and a speaker 142.

The left controller 170a is detachably held on the left side surface of the game machine body 110 by a holding unit (not illustrated in the drawings) provided on the left side surface of the game machine body 110. In addition, the right controller 170b is detachably held on the right side surface of the game machine body 110 by a holding unit (not illustrated in the drawings) provided on the right side surface of the game machine body 110.

When the left controller 170a is attached to the game machine body 110, a connector 185a is connected to a left connector 152a of the game machine body 110, thereby enabling wired communication between the left controller 170a and the game machine body 110. Similarly, when the right controller 170b is attached to the game machine body 110, a connector 185b is connected to a right connector 152b of the game machine body 110, thereby enabling wired communication between the right controller 170b and the game machine body 110. As a specification of wired communication, for example, a Universal Serial Bus (USB) (registered trademark) is adopted.

Graphic A1 of FIG. 1 illustrates a state in which the left controller 170a and the right controller 170b are attached to the game machine body 110. In this state, a user of the game machine 100 can play a game by operating a button 174a and a stick 175a of the left controller 170a with a left hand and operating a button 174b and a stick 175b of the right controller 170b with a right hand.

Graphic A2 of FIG. 1 illustrates a state in which the left controller 170a and the right controller 170b are removed from the game machine body 110. In this state, the left controller 170a and the right controller 170b perform wireless communication with the game machine body 110. Bluetooth (registered trademark) is adopted as a specification of wireless communication, for example. The user can play a game by operating the left controller 170a or the right controller 170b from a place away from the game machine body 110.

The vehicle 1 includes a steering wheel 2 operated by a driver, and a display 4 and speakers 5a and 5b are provided on a dashboard 3 of the vehicle 1. The steering wheel 2 corresponds to a steering unit of the present disclosure and is rotated and displaced left and right according to an operation by the driver. The steering wheel 2 is provided with an operation terminal holding unit 50 for detachably attaching the right controller 170b. In addition, the dashboard 3 is provided with a game machine body holding unit 60 for detachably attaching the game machine body 110 to a predetermined place visually recognizable by the driver and another passenger. The game machine body holding unit 60 corresponds to a terminal device holding unit of the present disclosure.

The operation terminal holding unit 50 has a recessed shape corresponding to an outer shape of the right controller 170b. In FIG. 1, a situation in which the right controller 170b is attached to the operation terminal holding unit 50 is indicated by arrow R1, and when a passenger such as a driver or the like fits the right controller 170b into the recess of the operation terminal holding unit 50, the right controller 170b is held by the operation terminal holding unit 50 and fixed to the steering wheel 2.

At this time, the connector 185b of the right controller 170b is connected to a connector 51 of the operation terminal holding unit 50. Since the connector 51 of the operation terminal holding unit 50 is connected to a vehicle electronic control unit (ECU) 10, wired communication between the vehicle ECU 10 and the right controller 170b becomes possible by attaching the right controller 170b to the operation terminal holding unit 50.

Note that the operation terminal holding unit 50 may hold the left controller 170a instead of the right controller 170b. Alternatively, the operation terminal holding unit 50 may be configured to be able to hold either one of the left controller 170a and the right controller 170b. When the left controller 170a is attached to the operation terminal holding unit 50, the connector 185a of the left controller 170a is connected to the connector 51 of the operation terminal holding unit 50, and wired communication between the vehicle ECU 10 and the left controller 170a becomes possible.

The game machine body holding unit 60 has a recessed shape corresponding to an outer shape of the game machine body 110. In FIG. 1, a situation in which the game machine body 110 is attached to the game machine body holding unit 60 is indicated by arrow R2, and when a passenger such as a driver or the like fits the game machine body 110 into the recess of the game machine body holding unit 60, the game machine body 110 is held and fixed by the game machine body holding unit 60. At this time, a lower connector 151 of the game machine body 110 is connected to a connector 61 of the game machine body holding unit 60. Since the connector 61 of the game machine body holding unit 60 is connected to the vehicle ECU 10, wired communication between the vehicle ECU 10 and the game machine body 110 becomes possible by attaching the game machine body 110 to the game machine body holding unit 60.

Figure 2:
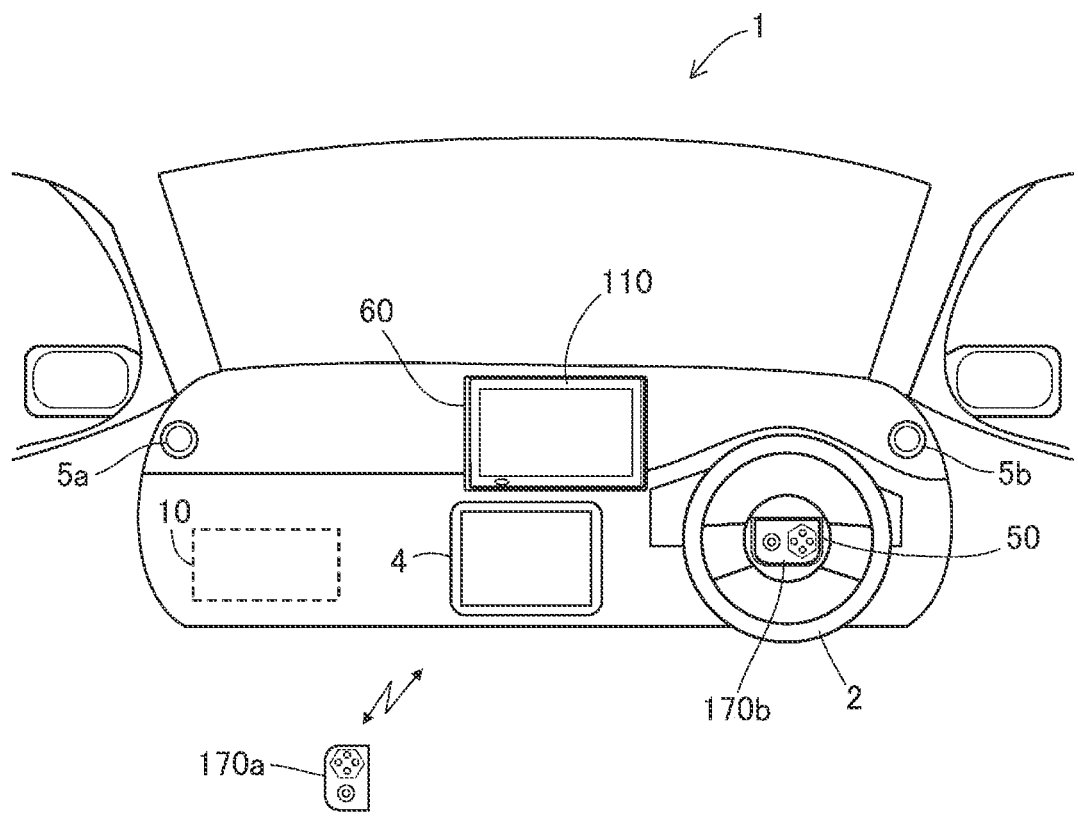
FIG. 2 is an explanatory diagram of a state in which a game machine body and one controller are attached to the vehicle.

FIG. 2 illustrates a state in which the right controller 170*b* is attached to the operation terminal holding unit 50. In this state, an attitude of the right controller 170*b* changes according to an operation of the steering wheel 2 by the driver. In this state, the driver of the vehicle 1 can operate the right controller 170*b* to give an instruction to the game machine body 110 and the vehicle ECU 10, and the passenger other than the driver can operate the left controller 170*a* to give an instruction to the game machine body 110 and the vehicle ECU 10. In addition, the passenger can watch an image displayed on the display 141 of the game machine body 110 and listen to sound output from the speaker 142.

Note that the left controller 170*a* and the right controller 170*b* can perform wireless communication with the game machine body 110 even in a state of being attached to the operation terminal holding unit 50. In addition, the left controller 170*a*, the right controller 170*b*, and the game machine body 110 may be configured to be able to perform wireless communication with the vehicle ECU 10.

Figure 3:
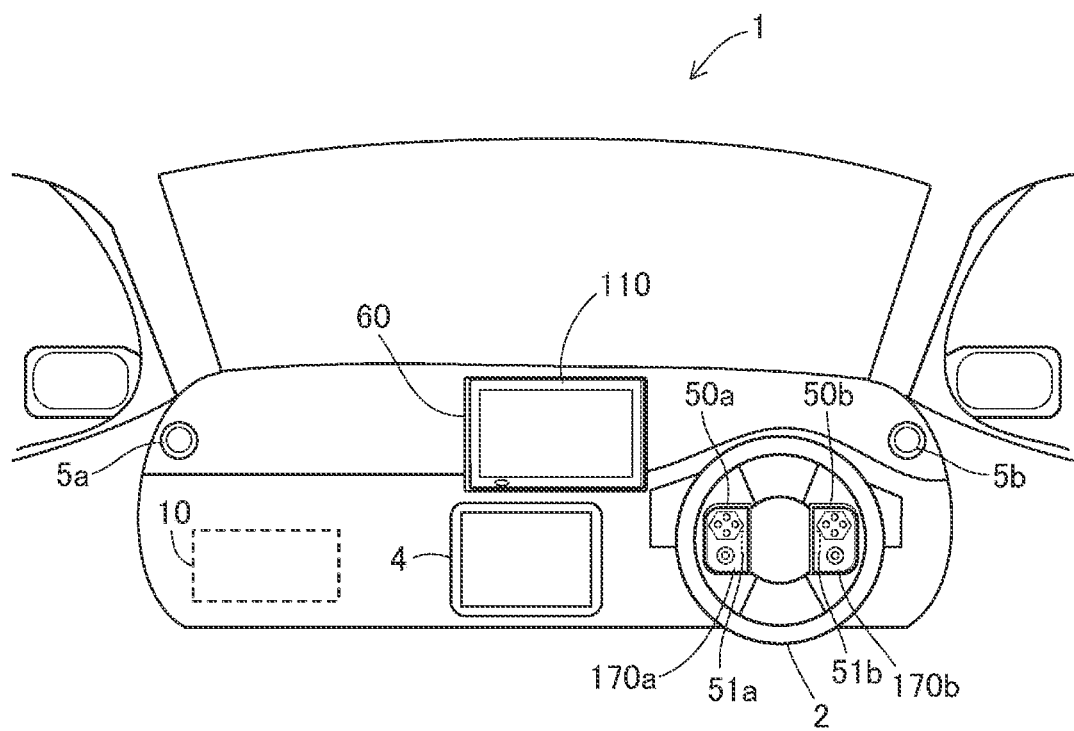
FIG. 3 is an explanatory diagram of a state in which the game machine body and two controllers are attached to the vehicle.

Next, FIG. 3 illustrates another configuration in which an operation terminal holding unit 50*a* to which the left controller 170*a* is attached and an operation terminal holding unit 50*b* to which the right controller 170*b* is attached are provided in the steering wheel 2 as the operation terminal holding units. Configurations of the operation terminal holding unit 50*a* and the operation terminal holding unit 50*b* are similar to the operation terminal holding unit 50 illustrated in FIGS. 1 and 2.

When the left controller 170*a* is attached to the operation terminal holding unit 50*a*, the connector 185*a* (see FIG. 1) of the left controller 170*a* is connected to a connector 51*a* of the operation terminal holding unit 50*a*, and wired communication between the left controller 170*a*, the game machine body 110, and the vehicle ECU 10 becomes possible. Similarly, when the right controller 170*b* is attached to the operation terminal holding unit 50*b*, the connector 185*b* (see FIG. 1) of the right controller 170*b* is connected to a connector 51*b* of the operation terminal holding unit 50*b*, and wired communication between the right controller 170*b*, the game machine body 110, and the vehicle ECU 10 becomes possible.

In the configuration of FIG. 3, attitudes of the left controller 170*a* and the right controller 170*b* change according to an operation of the steering wheel 2 by the driver. The game machine body 110 and the vehicle ECU 10 can recognize the attitude change of the left controller 170*a* by communication with the left controller 170*a* and can recognize the attitude change of the right controller 170*b* by communication with the right controller 170*b*.

2. Configuration of Game Machine Body

A configuration of the game machine body 110 will be described with reference to FIG. 4. The game machine body 110 includes a terminal device processor 120, and a memory 130, a communication unit 140, a display 141, a speaker 142, a microphone 143, an acceleration sensor 144, and an angular velocity sensor 145 connected to the terminal device processor 120. Further, the game machine body 110 includes a card slot 150, a lower connector 151, a left connector 152*a*, and a right connector 152*b* connected to the terminal device processor 120. The terminal device processor 120 corresponds to a computer. The memory 130 corresponds to a recording medium.

Figure 5:
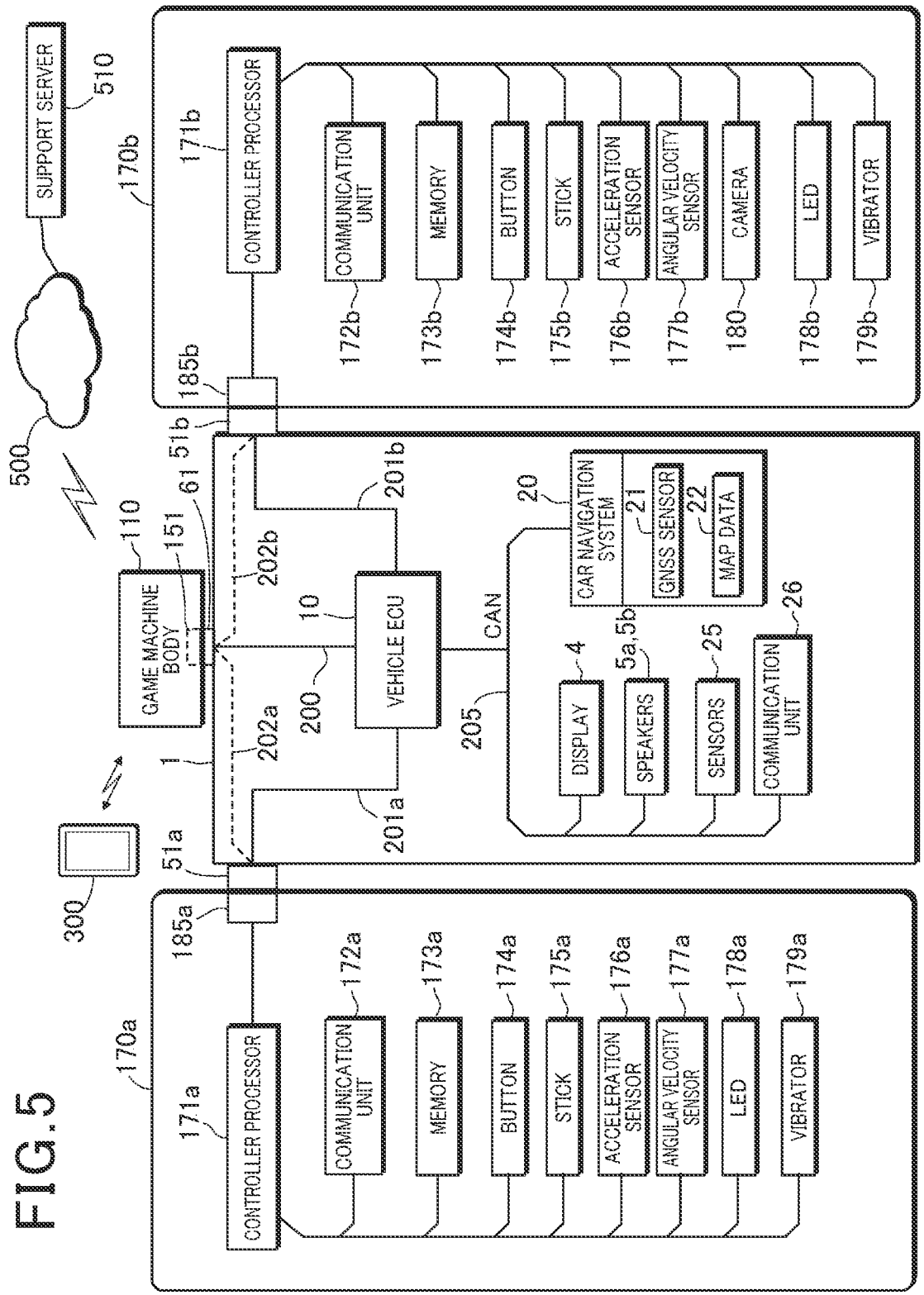
FIG. 5 is an explanatory diagram of a configuration of a controller and a mode connecting the controller to the game machine body and the vehicle.

The communication unit 140 performs wireless communication with the left controller 170*a*, the right controller 170*b*, and the like, and performs wireless communication with a support server 510 (see FIG. 5) via a communication network 500 (see FIG. 5). The display 141 is a touch panel in which a touch sensor is disposed on a surface of a flat-type display device such as a liquid crystal display (LCD) or the like, displays a screen according to an image control signal output from the terminal device processor 120, and inputs an operation signal according to a touch operation by a user to the terminal device processor 120.

The speaker 142 outputs a sound (voice, attention sound, music, and the like) corresponding to an acoustic signal output from the terminal device processor 120. The microphone 143 detects a sound such as a user's vocalization and the like and inputs a sound detection signal to the terminal device processor 120. The acceleration sensor 144 detects acceleration of the game machine body 110 and inputs an acceleration detection signal to the terminal device processor 120. The angular velocity sensor 145 detects an angular velocity of the game machine body 110 and inputs an angular velocity detection signal to the terminal device processor 120.

The memory 130 stores a control program 131 for controlling an overall operation of the game machine body 110, an interaction providing program 132 for executing interaction control to be described later, and a game application program 133 for executing a game. The card slot 150 reads and writes data from and in an inserted memory card 155.

As described above, the lower connector 151 is connected to the connector 61 of the game machine body holding unit 60. As described above, the left connector 152*a* is connected to the left controller 170*a*, or is connected to the connector 51 of the operation terminal holding unit 50 or the connector 51*a* of the operation terminal holding unit 50*a*. As described above, the right connector 152*b* is connected to the right controller 170*b*, or is connected to the connector 51 of the operation terminal holding unit 50 or the connector 51*b* of the operation terminal holding unit 50*b*.

The interaction providing program 132 may be read by the terminal device processor 120 from an external recording medium such as the memory card 155 or the like and stored in the memory 130, or may be downloaded from the support server 510 by the communication unit 140 and stored in the memory 130. The external recording medium may be a magnetic disk, an optical disk, or the like in addition to a flash memory such as the memory card 155 or the like. The memory 130 and the external recording medium are non-transitory tangible recording media that can be read and written by a computer.

The terminal device processor 120 reads and executes the control program 131 to control the overall operation of the game machine body 110 and reads and executes the game application program 133 to execute the processing of the game. In addition, the terminal device processor 120 functions as an operation terminal holding recognition unit 121, a terminal device holding recognition unit 122, an interaction control unit 123, and a content information output unit 124 by reading and executing the interaction providing program 132.

When recognizing that wired communication is established between the left controller 170a and the vehicle ECU 10 by communication with the vehicle ECU 10, the operation terminal holding recognition unit 121 recognizes that the left controller 170a is held in the operation terminal holding unit 50 (configurations of FIGS. 1 and 2) or the operation terminal holding unit 50a (case of FIG. 3). Similarly, when recognizing that wired communication is established between the right controller 170b and the vehicle ECU 10 by communication with the vehicle ECU 10, the operation terminal holding recognition unit 121 recognizes that the right controller 170b is held in the operation terminal holding unit 50 (configurations of FIGS. 1 and 2) or the operation terminal holding unit 50b (configuration of FIG. 3).

When recognizing that wired communication is established between the game machine body 110 and the vehicle ECU 10, the terminal device holding recognition unit 122 recognizes that the game machine body 110 is held in the game machine body holding unit 60. The interaction control unit 123 executes interaction control when the operation terminal holding recognition unit 121 recognizes that at least one of the left controller 170a and the right controller 170b is connected to the operation terminal holding units 50, 50a, and 50b and the terminal device holding recognition unit 122 recognizes that the game machine body 110 is held in the game machine body holding unit 60. Details of the interaction control will be described later.

When the operation terminal holding recognition unit 121 recognizes that at least one of the left controller 170a and the right controller 170b is connected to the operation terminal holding units 50, 50a, and 50b and the terminal device holding recognition unit 122 recognizes that the game machine body 110 is held in the game machine body holding unit 60, the content information output unit 124 outputs information of predetermined content from the display 141, the speaker 142, and the like of the game machine body 110. The predetermined content is content that can be used by installing a predetermined application in the game machine body 110, and is, for example, an additional item that can be used in the game executed by the game application program 133, another game related to the game executed by the game application program 133, and the like.

3. Configuration and Connection Mode of Controller

Configurations of the left controller 170a and the right controller 170b, and a connection mode between the left controller 170a and the right controller 170b, and the vehicle 1 and the game machine body 110 will be described with reference to FIG. 5.

The left controller 170a includes a controller processor 171a, and a communication unit 172a, a memory 173a, a button 174a, a stick 175a, an acceleration sensor 176a, an angular velocity sensor 177a, a light-emitting diode (LED) 178a, a vibrator 179a, and a connector 185a connected to the controller processor 171a. The acceleration sensor 176a and the angular velocity sensor 177a correspond to an attitude change detection unit of the present disclosure.

The controller processor 171a controls an overall operation of the left controller 170a by executing a control program stored in the memory 173a. The controller processor 171a performs wireless communication with the game machine body 110 via the communication unit 172a. In addition, the controller processor 171a transmits an operation signal of the button 174a, an operation signal of the stick 175a, an acceleration detection signal of the acceleration sensor 176a, and an angular velocity detection signal of the angular velocity sensor 177a to the game machine body 110.

Further, the controller processor 171a controls operations (turning on, turning off, and flashing) of the LED 178a and operations (turning vibration on, turning vibration off, and intensity of vibration) of the vibrator 179a according to the control signal to the left controller 170a transmitted from the game machine body 110.

Similarly to the left controller 170a, the right controller 170b includes a controller processor 171b, and a communication unit 172b, a memory 173b, a button 174b, a stick 175b, an acceleration sensor 176b, an angular velocity sensor 177b, an LED 178b, a vibrator 179b, and a connector 185b connected to the controller processor 171b, and operates similarly to the left controller 170a. Furthermore, the right controller 170b includes a camera 180 and transmits an image captured by the camera 180 to the game machine body 110.

The vehicle 1 includes a display 4, speakers 5a and 5b, sensors 25, a communication unit 26, and a car navigation system 20, which are connected to the vehicle ECU 10 by a controller area network (CAN) 205. The sensors 25 include a speed sensor that detects the traveling speed of the vehicle 1, an accelerator pedal sensor that detects an operation amount of an accelerator pedal (not illustrated in the drawings) provided in the vehicle 1, a brake pedal sensor that detects an operation amount of a brake pedal (not illustrated in the drawings) provided in the vehicle 1, an illuminance sensor that detects illuminance outside the vehicle, and the like. The communication unit 26 performs wireless communication with a communication terminal such as the smartphone 300 or the like and performs wireless communication with the support server 510 via the communication network 500. The support server 510 is a computer system composed of processors, memories, or the like. The car navigation system 20 includes a global navigation satellite system (GNSS) sensor 21 that detects the current location of the vehicle 1 and map data 22.

The vehicle ECU 10 is connected to the game machine body 110 via a communication line 200, is connected to the left controller 170a via a communication line 201a, and is connected to the right controller 170b via a communication line 201b. Thus, the vehicle ECU 10 performs wired communication with the game machine body 110, the left controller 170a, and the right controller 170b.

The game machine body 110 acquires detection information of the sensors 25, current location information of the vehicle by the GNSS sensor 21, the map data 22, and the like by communication with the vehicle ECU 10, and recognizes the traveling situation of the vehicle 1. In addition, the game machine body 110 can control the display of the display 4 of the vehicle 1 and the sound output from the speakers 5a and 5b by communication with the vehicle ECU 10.

In addition, as another configuration, the recognition that the game machine body 110 is held by the game machine body holding unit 60 and the recognition that the left controller 170a or the right controller 170b is held by the operation terminal holding units 50, 50a, and 50b may be performed on the game machine body 110 side and the left controller 170a and the right controller 170b side by a limit switch, a proximity sensor, a magnetic sensor, or the like instead of establishing wired communication with the vehicle ECU 10.

In the case of this configuration, it is not required to connect the game machine body 110, the left controller 170*a*, and the right controller 170*b* to the vehicle ECU 10, and the game machine body 110, the left controller 170*a*, and the right controller 170*b* are directly connected by the communication lines 202*a* and 202*b*, and it is possible to constitute the interaction providing system of the present disclosure just by the game machine body 110. In addition, communication between the game machine body 110 and the left controller 170*a* and the right controller 170*b* may be performed by wireless communication, and in this case, connection by the communication lines 202*a* and 202*b* is also unnecessary.

4. Process of Determining Whether or not to Execute Interaction Control

A process of determining whether or not to execute interaction control executed by the operation terminal holding recognition unit 121, the terminal device holding recognition unit 122, and the interaction control unit 123 will be described with reference to the flowchart illustrated in FIG. 6. Hereinafter, as described above with reference to FIGS. 1 and 2, processing for a configuration in which the operation terminal holding unit 50 for detachably holding the right controller 170*b* is provided in the steering wheel 2 will be described.

Figure 6:
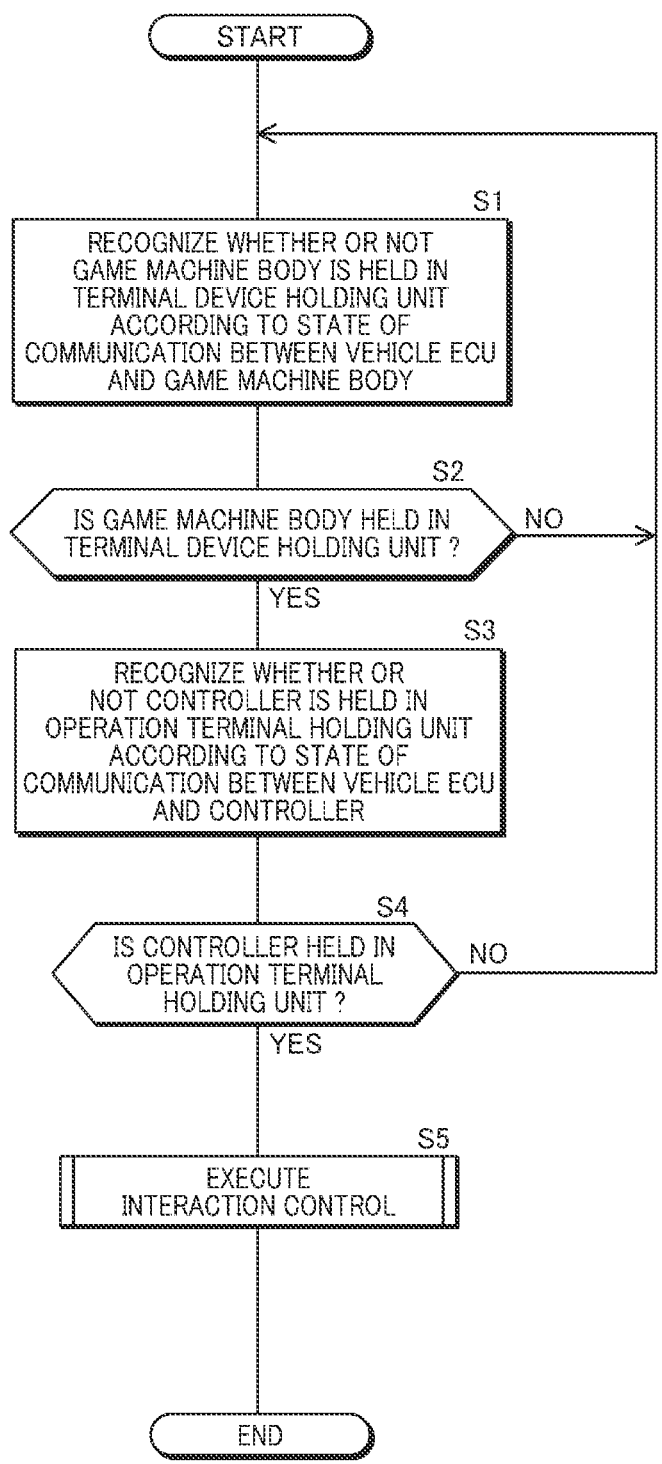
FIG. 6 is a flowchart of processing for determining whether or not to execute interaction control.

In step S1 of FIG. 6, the terminal device holding recognition unit 122 recognizes whether or not the game machine body 110 is held in the game machine body holding unit 60 according to a state of wired communication with the vehicle ECU 10. When wired communication is established between the game machine body 110 and the vehicle ECU 10, the terminal device holding recognition unit 122 determines that the game machine body 110 is held in the game machine body holding unit 60.

In subsequent step S2, when the terminal device holding recognition unit 122 recognizes that the game machine body 110 is held in the game machine body holding unit 60, the interaction control unit 123 advances the processing to step S3. On the other hand, when the terminal device holding recognition unit 122 does not recognize that the game machine body 110 is held in the game machine body holding unit 60, the interaction control unit 123 advances the processing to step S1.

In step S3, the operation terminal holding recognition unit 121 recognizes a state of wired communication between the right controller 170*b* and the vehicle ECU through communication with the vehicle ECU 10, and determines whether or not the right controller 170*b* is held in the operation terminal holding unit 50. When wired communication is established between the vehicle ECU 10 and the right controller 170*b*, the operation terminal holding recognition unit 121 recognizes that the right controller 170*b* is held in the operation terminal holding unit 50.

In subsequent step S4, when the operation terminal holding recognition unit 121 recognizes that the right controller 170*b* is held in the operation terminal holding unit 50, the interaction control unit 123 advances the processing to step S5 and executes interaction control. On the other hand, when the operation terminal holding recognition unit 121 does not recognize that the right controller 170*b* is held in the operation terminal holding unit 50, the interaction control unit 123 advances the processing to step S1. In this case, interaction control is not executed.

5. Interaction Control

An execution procedure of interaction control by the interaction control unit 123 will be described with reference to the flowchart illustrated in FIG. 7. Hereinafter, as described above with reference to FIGS. 1 and 2, processing for a configuration in which the operation terminal holding unit 50 for detachably holding the right controller 170*b* is provided in the steering wheel 2 will be described.

In step S10 of FIG. 7, the interaction control unit 123 receives detection signals of the acceleration sensor 176*b* and the angular velocity sensor 177*b* transmitted from the right controller 170*b* held in the operation terminal holding unit 50. In subsequent step S11, the interaction control unit 123 recognizes a situation of an attitude change of the right controller 170*b* based on the detection signals of the acceleration sensor 176*b* and the angular velocity sensor 177*b*. The situation of the attitude change includes a change amount, a change direction, a change speed, and the like of the attitude.

In subsequent step S12, the interaction control unit 123 receives the travel information of the vehicle 1 from the vehicle ECU 10. The travel information includes a travel speed, a travel point, a travel route, a destination, and the like of the vehicle 1. In the next step S13, the interaction control unit 123 recognizes the travel state of the vehicle 1 from the travel information.

In the next step S13, the interaction control unit 123 determines information to be output from the output device used in the vehicle 1 based on the situation of the attitude displacement of the right controller 170*b* and the travel state of the vehicle 1. The interaction control unit 123 uses the display 141 and the speaker 142 of the game machine body 110, the display 4 and the speakers 5*a* and 5*b* of the vehicle 1, and the like as output devices.

The interaction control unit 123 determines information to be output from the output device, for example, as follows.

Type, tempo, and volume of the music output from the speaker are changed according to the attitude change amount and change speed of the right controller 170*b*. In this case, the music output from the speaker may be music used in the game executed by the game application program 133.

Music to be output by the speaker and an image to be displayed on the display are changed according to the travel speed, the travel point, and the destination of the vehicle 1. In this case, also, the music output from the speaker may be music used in the game executed by the game application program 133, and the image displayed on the display may be an image of a scene of the game.

6. Other Embodiments

In the above-described embodiment, the vehicle 1 is exemplified as the mobile body of the present disclosure, but the configuration of the present disclosure can be applied to various mobile bodies such as a flying body that moves in the air, a ship that navigates on the water, and the like in addition to a vehicle that travels on the ground.

In the above-described embodiment, the left controller 170*a* and the right controller 170*b* of the game machine 100 are illustrated as the operation terminal of the present disclosure, but the operation terminal of the present disclosure may be a smartphone, a mobile phone, a portable game machine, or the like including an attitude detection unit.

As illustrated in FIG. 3, in a case where a plurality of controllers can be attached to the steering wheel 2, the processing content of the interaction control by the interaction control unit 123 may be changed according to the number of the attached controllers. For example, in a case where the left controller 170a and the right controller 170b are attached, by using detection signals of the acceleration sensor 176a and the angular velocity sensor 177a of the left controller 170a and the acceleration sensor 176b and the angular velocity sensor 177b of the right controller 170b in combination with each other, the operation situation of the steering wheel 2 may be recognized with higher accuracy, and the information to be output from the output device may be determined based on the operation situation of the steering wheel 2. Alternatively, the operation of the driver may be recognized also from the image by using the captured image of the camera 180 provided in the right controller 170b.

In the above-described embodiment, the example in which the content information output unit 124 is provided in the game machine body 110 has been described, but the content information output unit 124 may be omitted.

In the above-described embodiment, in a case where the terminal device holding recognition unit 122 recognizes that the game machine body is held in the game machine body holding unit 60 and the operation terminal holding recognition unit 121 recognizes that the right controller 170b is held in the operation terminal holding unit 50 by the processing according to the flowchart illustrated in FIG. 6, it is configured that the interaction control unit 123 executes the interaction control. As another configuration, the game machine body holding unit 60 and the terminal device holding recognition unit 122 may be omitted, and the interaction control unit 123 may execute the interaction control when the operation terminal holding recognition unit 121 recognizes that the right controller 170b is held in the operation terminal holding unit 50.

In the above embodiment, the interaction providing system of the present disclosure is constituted by the game machine body 110, but the interaction providing system may be constituted by the vehicle ECU 10. In this case, the interaction providing program 132 is stored in a memory included in the vehicle ECU 10, and a vehicle processor included in the vehicle ECU 10 executes the interaction providing program 132 to function as the operation terminal holding recognition unit 121, the terminal device holding recognition unit 122, the interaction control unit 123, and the content information output unit 124. The vehicle processor corresponds to a computer.

Alternatively, the interaction providing system may be constituted by the support server 510. The computer constituting the support server 510 executes the interaction providing program 132 to function as an operation terminal holding recognition unit 121, a terminal device holding recognition unit 122, an interaction control unit 123, and a content information output unit 124. In this case, the operation terminal holding recognition unit 121 and the terminal device holding recognition unit 122 determine whether or not the left controller 170a or the right controller 170b is held in the operation terminal holding unit 50 and whether or not the game machine body 110 is held in the game machine body holding unit 60 based on establishment information of wired communication between the vehicle ECU 10 and the game machine body 110, the left controller 170a, and the right controller 170b transmitted from the vehicle ECU 10 via the communication network 500.

In addition, the information of the acceleration detection signal and the angular velocity signal transmitted from the left controller 170a or the right controller 170b is transmitted to the support server 510 via the vehicle ECU 10, and the interaction control unit 123 recognizes the situation of the attitude change of the left controller 170a or the right controller 170b based on these pieces of information and determines the information to be output from the output device. Then, the interaction control unit 123 transmits the determined information to the vehicle ECU 10 and outputs the determined information from the output device used in the vehicle 1.

In the above-described embodiment, the game machine body 110 is indicated as the terminal device of the present disclosure, but the terminal device of the present disclosure may be any terminal device as long as the terminal device has a display and to which a controller is detachably attached, and may be an information terminal or the like other than the game machine body.

Figure 4:
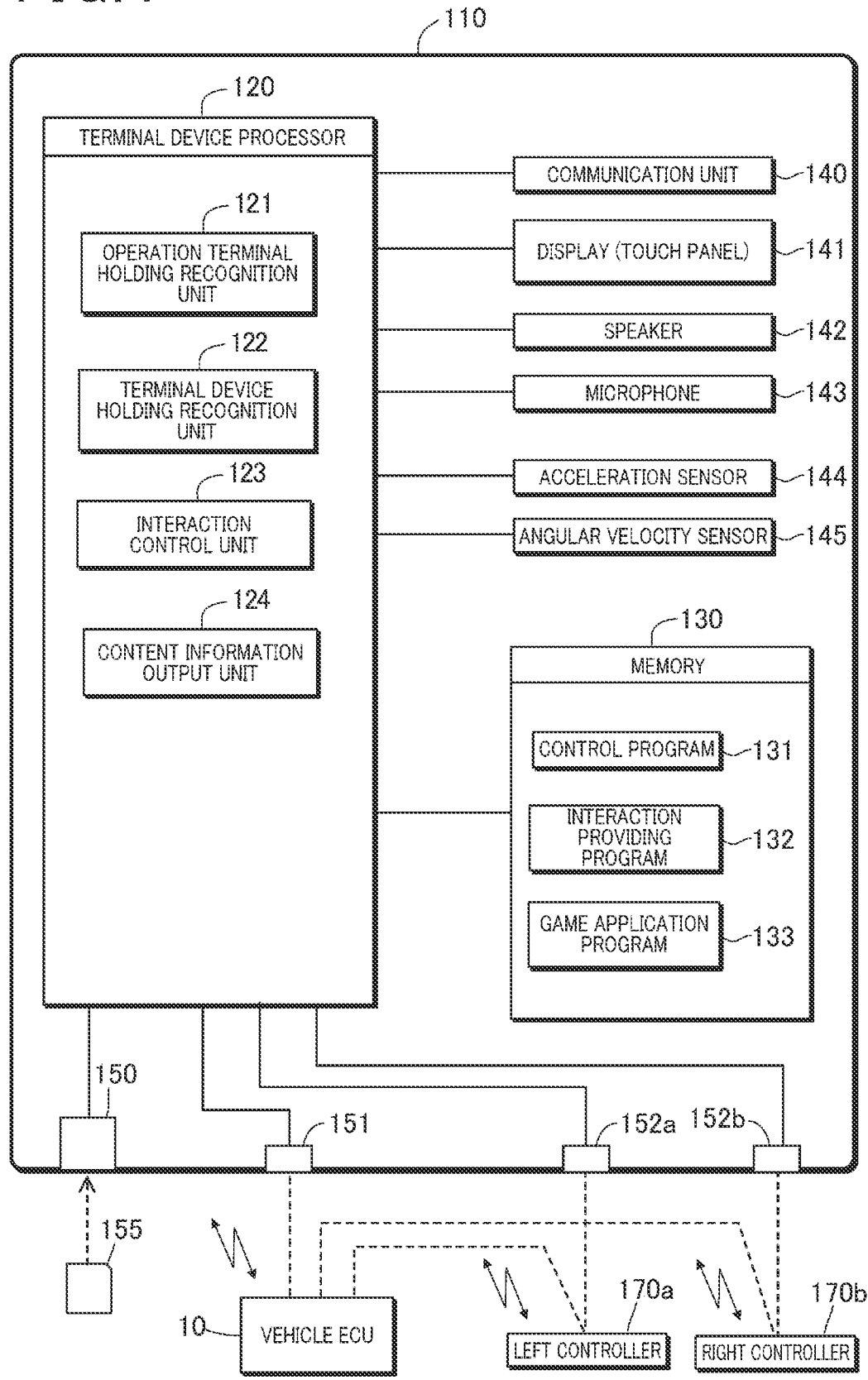
FIG. 4 is a configuration diagram of the game machine body.

Note that FIGS. 4 and 5 are schematic diagrams illustrating the configurations of the vehicle 1, the game machine body 110 including the functions of the interaction providing system, the left controller 170a, and the right controller 170b segmented according to main processing contents in order to facilitate understanding of the present invention, and the configurations of the vehicle 1, the game machine body 110, the left controller 170a, and the right controller 170b may be configured by other segmentations. In addition, the processing of each component may be executed by one hardware unit or may be executed by a plurality of hardware units. In addition, the processing of each component illustrated in FIGS. 6 and 7 may be executed by one program or may be executed by a plurality of programs.

7. Configuration Supported by Above-Described Embodiment

The above-described embodiment is a specific example of the following configuration.

(First item) A mobile body includes a steering unit that is displaced according to an operation by a driver, and an operation terminal holding unit that detachably holds, in the steering unit, an operation terminal including an attitude change detection unit that detects an attitude change.

According to the mobile body of the first item, the operation terminal holding unit is provided in the steering unit of the mobile body, and the attitude change detection unit of the operation terminal held by the operation terminal holding unit enables the operation situation of the steering unit to be recognized. With this simple configuration, it is possible to recognize the situation of the driver and provide the interaction.

(Second item) The mobile body according to the first item, further including a terminal device holding unit that detachably holds, at a predetermined position of the mobile body, a terminal device that has a display and to which the operation terminal is detachably attached as a controller.

According to the mobile body of the second item, the terminal device can be attached to the terminal device holding unit and used as an output device that displays the interaction.

(Third item) The mobile body according to the first or second item, in which the operation terminal holding unit detachably holds, in the steering unit, one or a plurality of the operation terminals detachably attached to the terminal device as a controller.

According to the mobile body of the third item, the controller of the terminal device can be diverted to a means for recognizing the operation situation of the steering unit. In addition, by attaching a plurality of controllers to the operation terminal holding unit, it is possible to recognize the operation situation of the steering unit in more detail.

(Fourth item) An interaction providing system for providing interaction in a mobile body including a steering unit that is displaced according to an operation by a driver, and an operation terminal holding unit that detachably holds, in the steering unit, an operation terminal including an attitude change detection unit that detects an attitude change, the interaction providing system includes an operation terminal holding recognition unit that recognizes that the operation terminal is held in the operation terminal holding unit, and an interaction control unit that executes interaction control to determine information to be output from an output device used in the mobile body based on a situation of detecting the attitude change of the operation terminal by the attitude change detection unit when the operation terminal holding recognition unit recognizes that the operation terminal is held in the operation terminal holding unit.

According to the interaction providing system of the fourth item, in a case where it is recognized that the operation terminal is held in the operation terminal holding unit provided in the steering unit of the mobile body, it is possible to provide interaction according to the situation of the driver based on the attitude change of the operation terminal recognized by the attitude change detection unit.

(Fifth item) The interaction providing system according to the fourth item, in which the operation terminal is a controller detachably attached to a terminal device including a display and a speaker, the mobile body includes a terminal device holding unit that detachably holds the terminal device at a predetermined position of the mobile body, and a terminal device holding recognition unit that recognizes that the terminal device is held in the terminal device holding unit, and the interaction control unit executes the interaction control using at least one of the display and the speaker as the output device in a case where the operation terminal holding recognition unit recognizes that the operation terminal is held in the operation terminal holding unit and the terminal device holding recognition unit recognizes that the terminal device is held in the terminal device holding unit.

According to the interaction providing system of the fifth item, the terminal device held in the terminal device holding unit can be diverted as an output device that outputs information by interaction control.

(Sixth item) The interaction providing system according to the fifth item, in which the operation terminal holding recognition unit, the terminal device holding recognition unit, and the interaction control unit are included in the terminal device.

According to the interaction providing system of the sixth item, it is possible to execute interaction control by the processing by the game machine body without depending on the processing by the mobile body.

(Seventh item) The interaction providing system according to the fourth item, in which the operation terminal is a controller of a terminal device, and the interaction providing system further includes a content information output unit that outputs, from the output device, information on content that can be used by installing a predetermined application in the terminal device when the operation terminal holding recognition unit recognizes that the operation terminal is held in the operation terminal holding unit.

According to the interaction providing system of the seventh item, it is possible to provide the information of the usable content to the driver or another passenger who enjoys the output of the information by the interaction control.

(Eighth item) The interaction providing system according to any one of the fourth to seventh items, in which the operation terminal holding unit detachably holds one or a plurality of the operation terminals, the operation terminal holding recognition unit recognizes the number of the operation terminals held in the operation terminal holding unit, and the interaction control unit changes content of processing by the interaction control according to the number of the operation terminals recognized by the operation terminal holding recognition unit.

According to the interaction providing system of the eighth item, it is possible to change the variation of the information output by the interaction control according to the number of operation terminals held in the operation terminal holding unit.

(Ninth item) The interaction providing system according to any one of the fourth to eighth items, further including a movement state recognition unit that recognizes a movement state of the mobile body, in which the interaction control unit determines, in the interaction control, the information to be output from the output device based on the attitude change of the operation terminal detected by the attitude change detection unit and the movement state of the mobile body recognized by the movement state recognition unit.

According to the interaction providing system of the ninth item, by adding the movement state of the mobile body to the determination element of the information to be output by the interaction control, it is possible to change the information to be output by the interaction control according to the movement state of the mobile body.

(Tenth item) An interaction providing method executed by a computer to provide interaction in a mobile body including a steering unit that is displaced according to an operation by a driver, and an operation terminal holding unit that detachably holds, in the steering unit, an operation terminal including an attitude change detection unit that detects an attitude change, the interaction providing method includes steps of recognizing that the operation terminal is held in the operation terminal holding unit, and executing interaction control to determine information to be output from an output device used in the mobile body based on a situation of detecting the attitude change of the operation terminal by the attitude change detection unit when it is recognized that the operation terminal is held in the operation terminal holding unit.

It is possible to realize the configuration of the interaction providing system of the fourth item by executing the interaction providing method of the tenth item by a computer.

(Eleventh item) A non-transitory recording medium storing an interaction providing program to be executed by a terminal device processor implemented in a terminal device to which a controller including an attitude change detection unit configured to detect an attitude change is detachably attached, the interaction providing program causing the terminal device processor to function as an operation terminal holding recognition unit configured to recognize that the controller is held in an operation terminal holding unit that is disposed in a steering unit of a mobile body and detachably holds the controller, and an interaction control unit configured to execute interaction control to determine information to be output from an output device used in the mobile body based on a situation of detecting the attitude change of the controller by the attitude change detection unit when it is recognized that the controller is held in the operation terminal holding unit.

By executing the interaction providing program of the eleventh item by the terminal device processor implemented in the terminal device, it is possible to execute processing of the interaction control by the terminal device and the controller without depending on processing by the mobile body.

REFERENCE SIGNS LIST

1 Vehicle (mobile body)
2 Steering wheel (steering unit)
3 Dashboard
4 Display
5a, 5b Speaker
10 Vehicle ECU
50, 50a, 50b Operation terminal holding unit
60 Game machine body holding unit (terminal device holding unit)
100 Game machine
110 Game machine body (interaction providing system)
120 Terminal device processor
121 Operation terminal holding recognition unit
122 Terminal device holding recognition unit
123 Interaction control unit
124 Content information output unit
130 Memory
131 Control program
132 Interaction providing program
133 Game application program
140 Communication unit
141 Display
142 Speaker
143 Microphone
144 Acceleration sensor
145 Angular velocity sensor
170a Left controller
170b Right controller
171a, 171b Controller processor
176a, 176b Acceleration sensor
177a, 177b Angular velocity sensor

What is claimed is:

1. A mobile body that is a vehicle, a flying body, or a ship, the mobile body comprising:
   a steering unit configured to be displaced according to an operation by a driver; and
   an operation terminal holding unit configured to detachably hold, in the steering unit, an operation terminal which includes an attitude change detection unit configured to detect an attitude change and which is detachably attached to a terminal device as a controller of the terminal device,
   the operation terminal includes an operation terminal connector, and when the operation terminal is attached to the terminal device, the operation terminal connector is connected to a terminal device connector provided to the terminal device, and
   the operation terminal holding unit includes an operation terminal holding unit connector, and when the operation terminal is held by the operation terminal holding unit, the operation terminal connector is connected to the operation terminal holding unit connector.

2. The mobile body according to claim 1, further comprising
   a terminal device holding unit configured to detachably hold, at a predetermined position of the mobile body, the terminal device that includes a display.

3. The mobile body according to claim 1, wherein
   the operation terminal holding unit detachably holds, in the steering unit, one or a plurality of the operation terminal.

4. An interaction providing system for providing interaction in a mobile body that is a vehicle, a flying body, or a ship, the mobile body including a steering unit configured to be displaced according to an operation by a driver, and an operation terminal holding unit configured to detachably hold, in the steering unit, an operation terminal which includes an attitude change detection unit configured to detect an attitude change and which is to be detachably attached to a terminal device as a controller of the terminal device, wherein
   the operation terminal includes an operation terminal connector, and when the operation terminal is attached to the terminal device, the operation terminal connector is connected to a terminal device connector provided to the terminal device,
   the operation terminal holding unit includes an operation terminal holding unit connector, and when the operation terminal is held by the operation terminal holding unit, the operation terminal connector is connected to the operation terminal holding unit connector, and
   the interaction providing system comprises a processor that includes:
      an operation terminal holding recognition unit configured to recognize that the operation terminal is held in the operation terminal holding unit; and
      an interaction control unit configured to execute interaction control to determine information to be output from an output device used in the mobile body based on a situation of detecting the attitude change of the operation terminal by the attitude change detection unit when the operation terminal holding recognition unit recognizes that the operation terminal is held in the operation terminal holding unit.

5. The interaction providing system according to claim 4, wherein
   the operation terminal is a controller detachably attached to a terminal device including a display and a speaker,
   the mobile body includes a terminal device holding unit configured to detachably hold the terminal device at a predetermined position of the mobile body,
   the processor further includes a terminal device holding recognition unit configured to recognize that the terminal device is held in the terminal device holding unit, and
   the interaction control unit executes the interaction control using at least one of the display and the speaker as the output device in a case where the operation terminal holding recognition unit recognizes that the operation terminal is held in the operation terminal holding unit and the terminal device holding recognition unit recognizes that the terminal device is held in the terminal device holding unit.

6. The interaction providing system according to claim 5, wherein
   the operation terminal holding recognition unit, the terminal device holding recognition unit, and the interaction control unit are included in the terminal device.

7. The interaction providing system according to claim 4, wherein
the processor further includes a content information output unit configured to output, from the output device, information on content that can be used by installing a predetermined application in the terminal device when the operation terminal holding recognition unit recognizes that the operation terminal is held in the operation terminal holding unit.

8. The interaction providing system according to claim 4, wherein
the operation terminal holding unit detachably holds one or a plurality of the operation terminals,
the operation terminal holding recognition unit recognizes a number of the operation terminals held in the operation terminal holding unit, and
the interaction control unit changes content of processing by the interaction control according to the number of the operation terminals recognized by the operation terminal holding recognition unit.

9. The interaction providing system according to claim 4, wherein
the processor further includes a movement state recognition unit configured to recognize a movement state of the mobile body, wherein
the interaction control unit determines, in the interaction control, the information to be output from the output device based on the attitude change of the operation terminal detected by the attitude change detection unit and the movement state of the mobile body recognized by the movement state recognition unit.

10. An interaction providing method executed by a computer to provide interaction in a mobile body that is a vehicle, a flying body, or a ship, the mobile body including a steering unit configured to be displaced according to an operation by a driver, and an operation terminal holding unit configured to detachably hold, in the steering unit, an operation terminal which includes an attitude change detection unit configured to detect an attitude change and which is detachably attached to a terminal device as a controller of the terminal device, wherein
the operation terminal includes an operation terminal connector, and when the operation terminal is attached to the terminal device, the operation terminal connector is connected to a terminal device connector provided to the terminal device,
the operation terminal holding unit includes an operation terminal holding unit connector, and when the operation terminal is held by the operation terminal holding unit, the operation terminal connector is connected to the operation terminal holding unit connector, and
the interaction providing method comprises:
recognizing that the operation terminal is held in the operation terminal holding unit; and
executing interaction control to determine information to be output from an output device used in the mobile body based on a situation of detecting the attitude change of the operation terminal by the attitude change detection unit when it is recognized that the operation terminal is held in the operation terminal holding unit.

* * * * *